(12) United States Patent
Files et al.

(10) Patent No.: US 10,854,174 B2
(45) Date of Patent: Dec. 1, 2020

(54) SYSTEM AND METHOD FOR ADJUSTING A POSITIONING OF A USER INTERFACE BASED ON A USER'S POSITION

(71) Applicant: Dell Products L.P., Round Rock, TX (US)

(72) Inventors: Jace William Files, Round Rock, TX (US); Yagiz Can Yildiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 16/277,546

(22) Filed: Feb. 15, 2019

(65) Prior Publication Data
US 2020/0265808 A1 Aug. 20, 2020

(51) Int. Cl.
*G09G 5/38* (2006.01)
*G09G 5/373* (2006.01)
*H04N 5/33* (2006.01)
*G06F 3/02* (2006.01)

(52) U.S. Cl.
CPC .............. *G09G 5/38* (2013.01); *G09G 5/373* (2013.01); *G06F 3/0202* (2013.01); *G09G 2340/045* (2013.01); *G09G 2340/0464* (2013.01); *G09G 2354/00* (2013.01); *H04N 5/33* (2013.01)

(58) Field of Classification Search
None
See application file for complete search history.

(56) References Cited

U.S. PATENT DOCUMENTS

| 9,547,412 | B1* | 1/2017 | Dillon | G06F 3/04815 |
| 2014/0085342 | A1* | 3/2014 | Shoemaker | G06F 3/017 345/672 |
| 2015/0331594 | A1* | 11/2015 | Terada | G06F 3/04845 715/801 |
| 2015/0369612 | A1* | 12/2015 | Nishimura | G01C 21/3484 701/537 |
| 2017/0169759 | A1* | 6/2017 | Jang | G09G 3/3406 |
| 2018/0174584 | A1* | 6/2018 | Chih | F16M 11/10 |
| 2018/0210504 | A1* | 7/2018 | Moser | G06F 1/1616 |
| 2019/0303177 | A1* | 10/2019 | Master | G06F 3/0304 |

\* cited by examiner

*Primary Examiner* — Sarah Le
(74) *Attorney, Agent, or Firm* — Baker Botts L.L.P.

(57) ABSTRACT

Methods, systems, and computer programs encoded on computer storage medium, for determining a viewing location of a user with respect to a computing device, the viewing location including a viewing distance and a viewing angle of the user with respect to the computing device; determining that a physical input device is physically coupled to a display of the computing device; determining a location of a graphical object within a graphical user interface (GUI) presented by the display of the computing device; determining, based on the viewing location of the user and the location of the graphical object, that the graphical object is included by a non-visible portion of the GUI; and adjusting display dimensions of the GUI such that an updated location of the graphical object is included by a visible portion of the GUI.

20 Claims, 5 Drawing Sheets

SYSTEM AND METHOD FOR ADJUSTING A POSITIONING OF A USER INTERFACE BASED ON A USER'S POSITION

BACKGROUND

Field of the Disclosure

The disclosure relates generally to information handling systems, and, more particularly, information handling systems for adjusting a positioning of a user interface based on a user's position.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes determining, by a computing module, a viewing location of a user with respect to a computing device, the viewing location including a viewing distance and a viewing angle of the user with respect to the computing device; determining, by the computing module, that a physical input device is physically coupled to a display of the computing device; in response to determining that the physical input device is physically coupled to the display of the computing device, determining, by the computing module, a location of a graphical object within a graphical user interface (GUI) presented by the display of the computing device; determining, by the computing module and based on the viewing location of the user and the location of the graphical object, that the graphical object is included by a non-visible portion of the GUI; and in response to determining that the graphical object is included by the non-visible portion of the GUI, adjusting, by the computing module, display dimensions of the GUI such that an updated location of the graphical object is included by a visible portion of the GUI.

Other embodiments of these aspects include corresponding system, apparatus, and computer programs, configured to perform the actions of the methods, encoded on computer storage devices.

These and other embodiments may each optionally include one or more of the following features. For instance, determining, by the computing module, a new viewing location of the user with respect to the computing device, the new viewing location including a new viewing distance and a new viewing angle of the user with respect to the computing device; determining, by the computing module and based on the new viewing location of the user and the updated location of the graphical object, that the graphical object is included by the non-visible portion of the GUI; and in response to determining that the graphical object is included by the non-visible portion of the GUI, re-adjusting, by the computing module, display dimensions of the GUI such that a further updated location of the graphical object is included by the visible portion of the GUI. Determining, by the computing module, that an adjustment of the display dimensions is less than a threshold; and in response to determining that the adjustment of the display dimensions is less than the threshold, foregoing adjusting display dimensions of the GUI. Determining, by the computing module, a hinge angle of the computing device, wherein the graphical object is determined to be included by the non-visible portion of the GUI further based on the hinge angle of the computing device. The computing device is a dual-display computing device, with each display of the dual-display computing device are within respective planes. Determining, by the computing module, an orientation of the computing device; and identifying, by the computing module and based on the orientation of the computing device, a particular display of the dual-display computing device that the physical input device is physically coupled to. Determining the viewing location of the user with respect to the computing device further comprises obtaining, by the computing module, camera-based data indicating the viewing location of the user, and wherein determining the new viewing location of the user with respect to the computing device further comprises obtaining, by the computing module, infrared time-of-flight data indicating the new viewing location of the user. Determining the viewing location of the user with respect to the computing device further comprises obtaining, by the computing module, eye-gaze-based data indicating the viewing location of the user, and wherein determining the new viewing location of the user with respect to the computing device further comprises obtaining, by the computing module, infrared time-of-flight data indicating the new viewing location of the user. Determining the viewing location of the user with respect to the computing device further comprises obtaining, by the computing module, camera-based data indicating the viewing location of the user, and wherein determining the new viewing location of the user with respect to the computing device further comprises obtaining, by the computing module, camera-based data indicating the new viewing location of the user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for adjusting a positioning of a user interface based on a user's position. Specifically, this document describes a system and a method for determining a viewing location of a user with respect to a computing device, the viewing location including a viewing distance and a viewing angle of the user with respect to the computing device. A physical input device is determined to be physically coupled to a display of the computing device. In response to determining that the physical input device is physically coupled to the display of the computing device, a location of a graphical object is determined to be within a graphical user interface (GUI) presented by the display of the computing device. It is determined, based on the viewing location of the user and the location of the graphical object, that the graphical object is included by a non-visible portion of the GUI. In response to determining that the graphical object is included by the non-visible portion of the GUI, display dimensions of the GUI are adjusted such that an updated location of the graphical object is included by a visible portion of the GUI.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
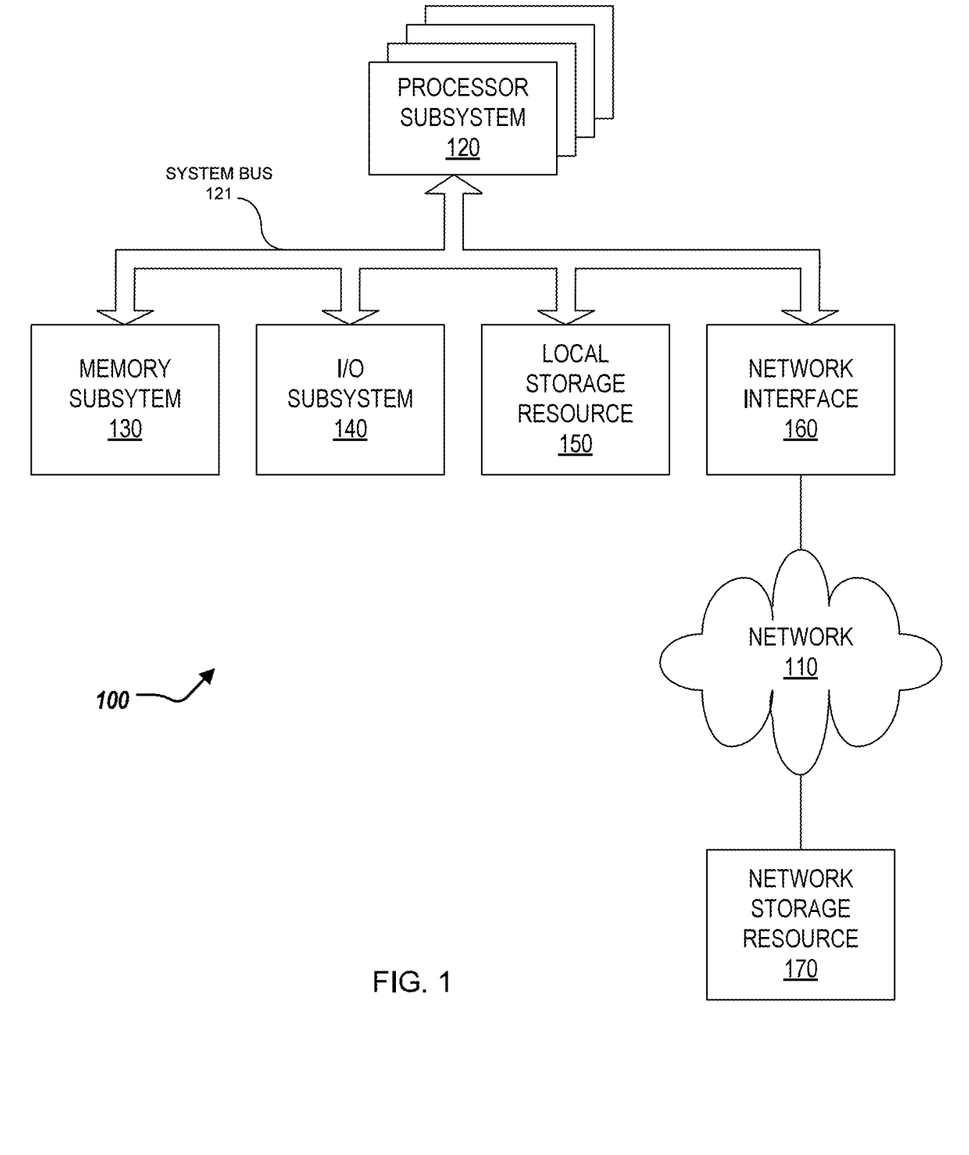
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
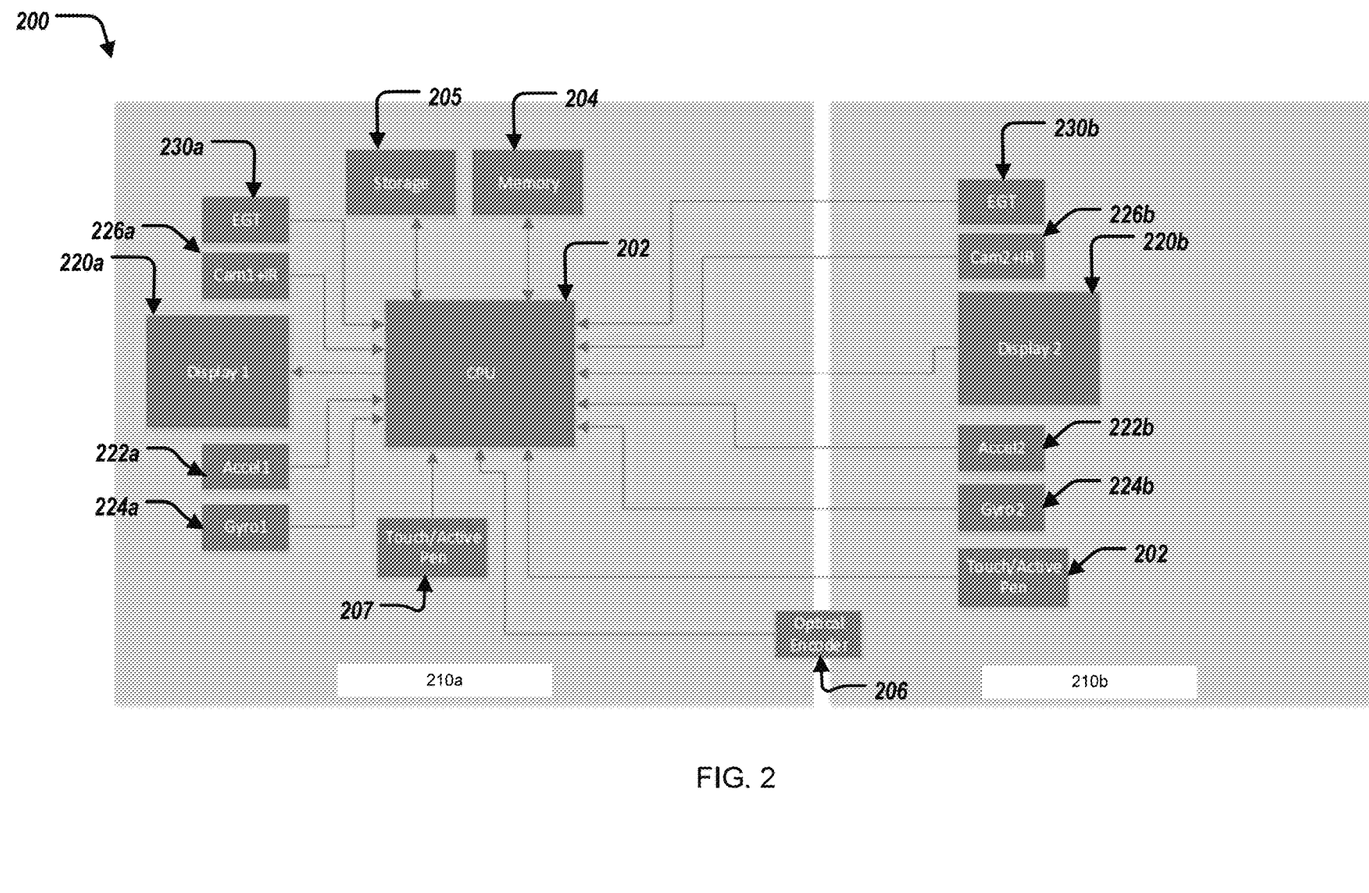
FIG. 2 illustrates a computing device for adjusting a positioning of a user interface based on a user's position.

Turning now to FIG. 2, FIG. 2 depicts a computing device 200 for adjusting a positioning of an user interface based on a user's position. The computing device 200 can be similar to the information handling system 100 of FIG. 1. The computing device 200 includes a central processing unit (CPU) 202, memory 204, storage 205, an optical encoder 206, and a touch/active pen 207. The computing device 200 can further include a first portion 210a and a second portion 210b. The first portion 210a can include a first display 220a, a first accelerometer 222a, a first gyroscope 224a, a first camera/infrared module 226a, and a first eye-gaze tracking module 230a. The second portion 210b can be similar to the first portion 210a, and can include a second display 220b, a second accelerometer 222b, a second gyroscope 224b, a second camera/infrared module 226b, and a second eye-gaze tracking module 230b.

Figure 3:
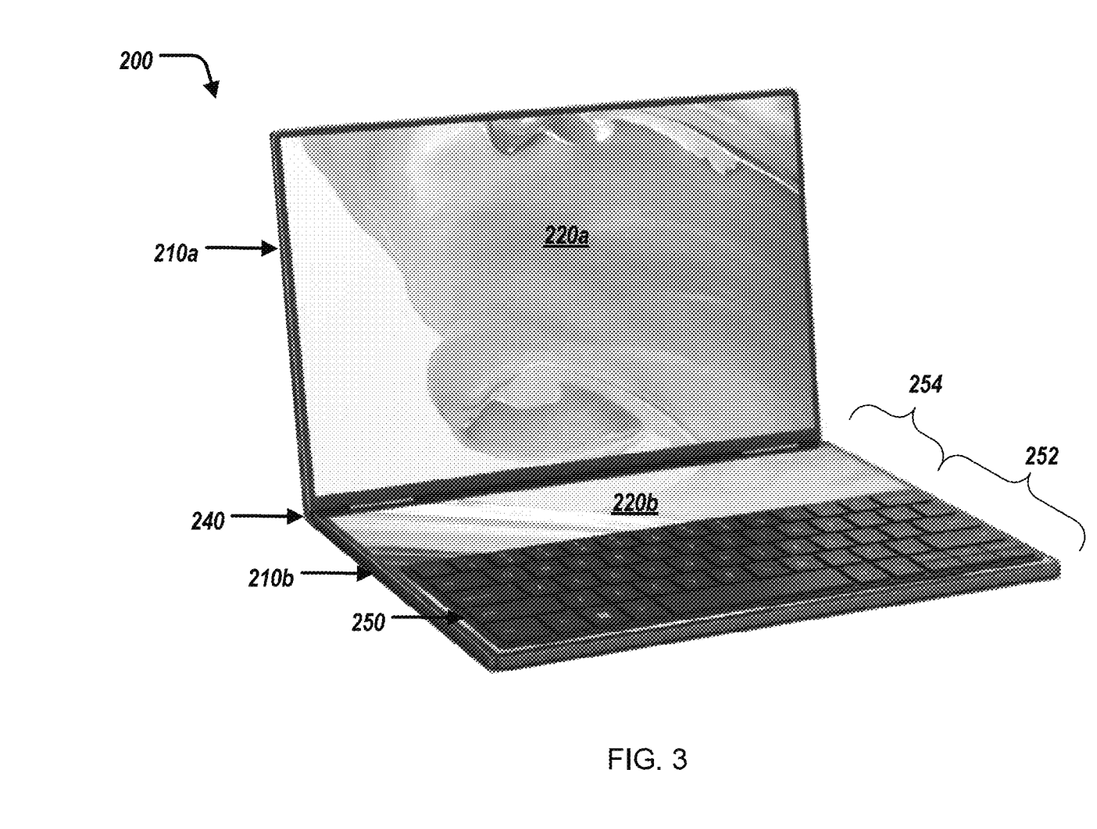
FIG. 3 illustrates a computing device including multiple displays and a physical input device.

In some examples, the first portion 210a can be coupled to the second portion 210b via a hinge element 240, as shown in FIG. 3. The computing device 200 can further include a physical input device 250, such as a keyboard as illustrated. However, the physical input device 250 can include any input device, such as a mouse, trackpad, dial, etc. The physical input device 250 can be removably coupled to one of the portions 210a, 210b. In the illustrated example, the physical input device 250 can be physically coupled to the second portion 210b, that is, the physical input device 250 is positioned upon the second display 220b obscuring a portion of the second display 220b from view (e.g., from user of the computing device 200). That is, the physical input device 250 can visibility obscure a portion 252 of the second display.

However, the physical input device 250 can also obscure a visibility of a portion 254 of the second display 220b that is not physically coupled to (in direct contact with) the physical input device 250. In some examples, the visibility of the portion 254 of the second display 220b can be based on a user's eye/head height and distance to the second display 220b. The visibility of the portion 254 of the second display 220b can further be based on a height of the physical input device 250—a height measured from the surface of the second display 220b to the top of the physical input device 250 opposite the surface of the second display 220b. For example, a user at a 15-degree angle to a 9-millimeter keyboard will have a 30-millimeter obstruction of the portion 254 of the second display 220b, while a user at a 75-degree angle with respect to the same keyboard will have an obstruction of 2.1 millimeters of the portion 254 of the second display 220b. To that end, as the position of the user changes, and the position of the physical input device changes, the visibility of the portion 254 of the second display 220b can vary.

Figure 4:
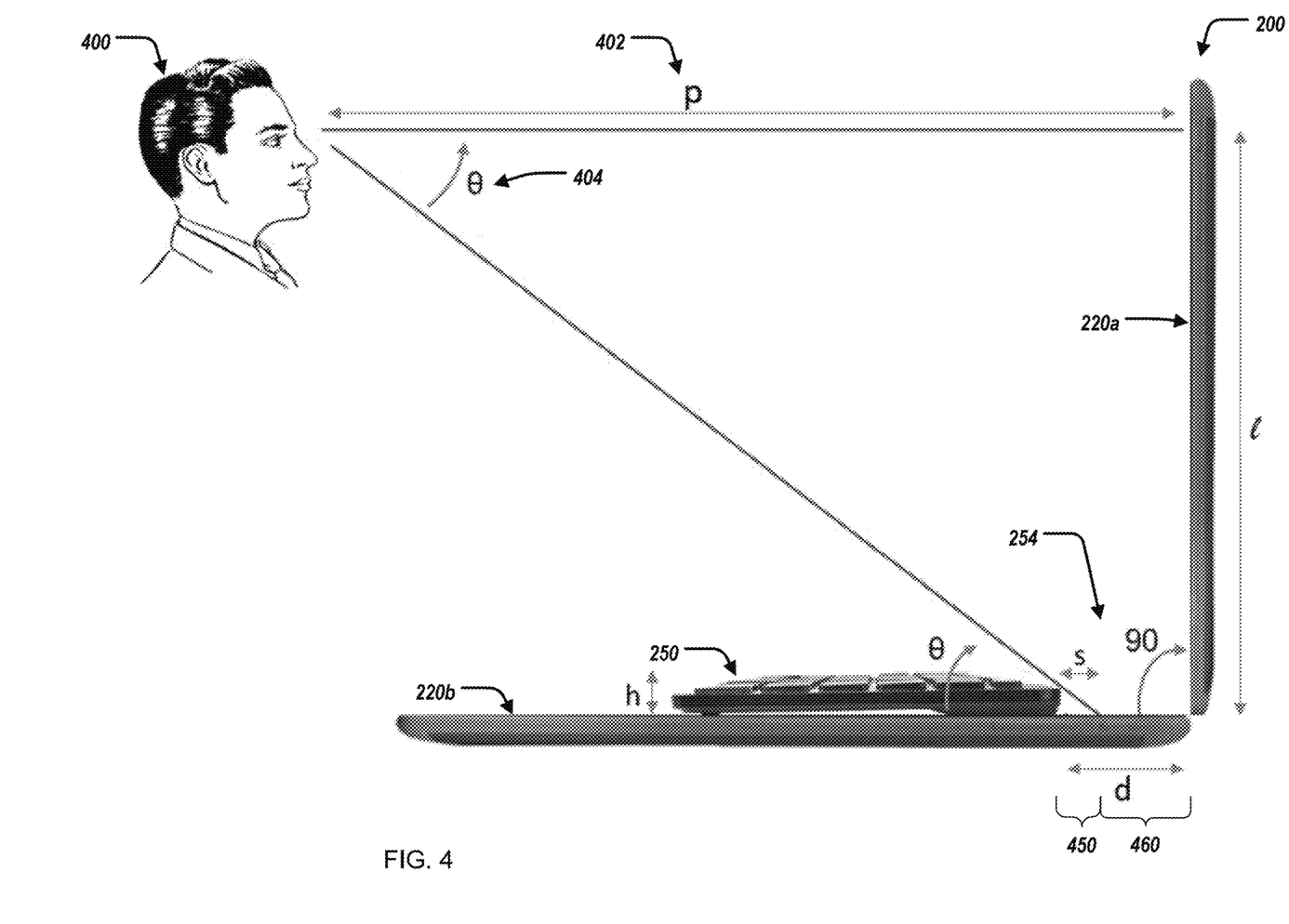
FIG. 4 illustrates a user's position with respect to a computing device.

In some implementations, the CPU 202 can determine a viewing location of a user 400 with respect to the computing device 200, as illustrated in FIG. 4. In some examples, the viewing location can include a viewing distance of the user 400 with respect to the computing device 200, shown as viewing distance 402. In some examples, the viewing location can include a viewing angle of the user 400 with respect to the computing device 200, shown as viewing angle 404. In other words, the CPU 202 can establish a location calibration of the user 400 with respect to the computing device 200.

In some examples, the first camera module 226a, the first eye-gaze tracking module 230a, or a combination thereof, can obtain data that indicates the viewing location of the user 400. For example, the camera module 226a and/or the first eye-gaze tracking module 230a can execute a baseline calibration location of the user's 400 head/eye location at a given distance (e.g., the viewing distance 402) at the normal viewing angle (e.g., the viewing angle 404). In some examples, the camera module 226a and/or the first eye-gaze tracking module 230a can utilize facial recognition IR to obtain data that indicates the viewing location of the user 400 for the baseline calibration.

In some implementations, the CPU 202 determines that the physical input device 250 is physically coupled to the second display 220b of the computing device 200. In some examples, the CPU 202 can recognize that the physical input device 250 is physical coupled to the second display 220b of the computing device 200 through one or more means such as sensors, magnets, or similar. In some examples, the touch/active pen 207 can recognize the coupling of the physical input device 250 to the second display 220b—e.g., through a touch digitizer. Furthermore, the physical input device 250 can be physically coupled to the second display 220b at differing locations of the second display 220b. For example, the physical input device 250 can be coupled to the second display 220b at a "top" of the second display 220b proximate to the first display 220a, or at "bottom" of the second display 220b distal from the first display 220a.

In some implementations, the CPU 202 can determine a location of a graphical object within a graphical user interface (GUI) presented by the second display 220b, and in particular, the portion 254 of the second display 220b. In some examples, the portion 254 of the second display 220b can present a GUI that includes one or more graphical objects—e.g., text, icons, photos, videos, or any type of displayable content. In some examples, the CPU 202 can receive data indicating the location of the graphical objects that are presented within the portion 254 of the second display 220b from a corresponding driver/API of the graphical objects. The location of the graphical objects can include a pixel location of the graphical objects within the portion 254 of the second display 220b, or another coordinate system indicating such location of the graphical objects.

In some examples, the CPU 202 determines the location of the graphical objects within the GUI that is presented by the second display 220b in response to determining that the physical input device 250 is coupled to the second display 220b. That is, when the physical input device 250 is not coupled to the second display 220b, the entire second display 220b is available for display of graphical objects, and visibility of such is not obstructed by the physical input device 250. However, when the physical input device 250 is physically coupled to the second display 220b, the CPU 202 then determines the location of the graphical objects within the GUI that is presented by the second display 220b.

In some implementations, the CPU 202 determines that the graphical object is included by a non-visible portion of the GUI. That is, the CPU 202 determines that a non-visible portion of the portion 254 of the second display 220b includes the graphical object. The CPU 202 can determine that such a portion of the portion 254 of the second display 220b is non-visible based on the viewing location of the user 400 and the location of the graphical object. In the illustrated example of FIG. 4, the CPU 202 can determine a non-visible portion 450 of the portion 254 of the second display 220b. In some examples, the CPU 202 can determine that the width s of the non-visible portion 450 can be based on the height h of the physical input device 450, the viewing distance p of the user 400 with respect to the computing device 200 (and specifically, the distance p is the horizontal distance between the user 400 and an imaginary line vertically extending from the hinge 240), a distance d of the portion 254 of the second display 220b, and a length l of user's 400 distance from a plane of the second display 220b. In the illustrated example of FIG. 4, for a 90-degree angle defined between the first display 220a and the second display 220b, the width s can be defined by Equation 1:

$$s = h \times \frac{(p-d)}{(l-h)}. \qquad \text{Equation (1)}$$

In some implementations, the CPU 202 adjusts display dimensions of the GUI such that an updated location of the graphical object is included by a visible portion of the GUI. That is, the CPU 202 adjusts the display dimensions of the GUI of the portion 254 of the second display 220b such that a visible portion of the portion 254 includes the graphical object based on the viewing location of the user 400. For example, the CPU can determine a visible portion 460 of the portion 254 of the second display 220b. To that end, the CPU 202 can adjust the display dimensions of the GUI such that the graphical object is included by the visible portion 460. For example, the CPU 202 can adjust the display dimensions of the GUI (and thus, the graphical elements included by the GUI) such that the GUI is included only by the visible portion 460, and further, the non-visible portion 450 does not include the GUI or the graphical element. In some examples, adjusting the displaying dimensions of the GUI by the CPU 202 can include moving the GUI within the visible portion 460 (without adjusting a size of the GUI).

In the illustrated example, the visible portion 460 can be defined by the distance d-s. Thus, the CPU 202 can adjust the display dimensions of the GUI such that only the visible portion 460 encompasses the GUI. In some examples, adjusting the display dimensions of the GUI can include reducing the size of the GUI, and/or removing graphical portions of the GUI such that the GUI is only included by the visible portion 460. In some examples, the CPU 202 adjusts the display dimensions of the GUI in response to determining that the graphical object of the GUI is included by the non-visible portion 450 of the portion 254 of the second display 220b.

In some examples, the physical input device 250 can be physically coupled to the first display 220a, and the second camera module 226b, the second eye-gaze tracking module 230b, or a combination thereof, can obtain data that indicates the viewing location of the user 400, similar to that described above. Further, the CPU 202 can then determine a location of a graphical object with a GUI presented by the first display 220a, and determine that the graphical object is included by a non-visible portion of the GUI of the first display 220a. The CPU 202 can then adjust the display dimensions of the GUI of the first display 220a such that an updated location of the graphical object is included by a visible portion of the GUI of the first display 220a.

In some examples, the CPU 202 can determine that an adjustment of the display dimensions of the GUI that includes the graphical element is less than a threshold. That is, the CPU 202 can determine that any adjust of the display dimensions of the GUI is of a magnitude that is less than a predetermined threshold. For example, the threshold can represent a percentage or quantity that the GUI can be adjusted in size, and any adjustment less than such can lead to a poor user experience—adjusting the GUI that can be minimal, or unperceivable by the user could lead to a poor user experience. In some examples, the threshold can relate to a threshold dimension (e.g., height or width of the GUI) or a total area of the GUI.

To that end, when the CPU 202 determines that the adjustment of the display dimensions of the GUI is less than the threshold, the CPU foregoes adjusting the display dimensions of the GUI. That is, the CPU 202 maintains the display dimensions of the GUI based on the viewing location of the user 400 and the location of the graphical object.

In some examples, the CPU 202, after establishing the location calibration of the user 400 with respect to the computing device 200, can perform steady-state location analysis of the user 400 with respect to the computing device 200. In short, during steady-state location analysis, the CPU 202 can approximate the user's 400 distance that can be periodically retrieved from the camera/infrared modules 226, e.g., utilizing time-of-flight information from the camera/infrared modules 226.

Specifically, as the position of the user changes and/or the position of the physical input device 250 changes, the visibility of the portion 254 of the second display 220b can vary. In some examples, the CPU 202 can determine a new viewing location of the user 400 with respect to the computing device 200. In some examples, the new viewing location can include a new viewing distance of the user 400 with respect to the computing device 200. In some examples, the new viewing location can include a new viewing angle of the user 400 with respect to the computing device 200. The CPU 202 determines that the graphical object is included by the non-visible portion of the GUI. That is, the CPU 202 determines that the non-visible portion of the portion 254 of the second display 220b includes the graphical object. The CPU 202 can determine that such a portion of the portion 254 of the second display 220b is non-visible based on the new viewing location of the user 400 and the updated location of the graphical object. The CPU 202 re-adjusts display dimensions of the GUI such that a further updated location of the graphical object is included by the visible portion of the GUI. That is, the CPU 202 re-adjusts the display dimensions of the GUI of the portion 254 of the second display 220b such that the visible portion of the portion 254 includes the graphical object based on the viewing location of the user 400.

In some examples, the CPU 202 can obtain from the camera/infrared module 226a the infrared time-of-flight data that indicates the new viewing location of the user 400. The CPU 202 can determine the new viewing location of the user 400 based on the time-of-flight data from the camera/infrared module 226a. In some examples, the CPU 202 can obtain data from the first camera module 226a, the first eye-gaze tracking module 230a, or a combination thereof, that indicates the new viewing location of the user 400. The CPU 202 can determine the new viewing location of the user 400 based on the data from the first camera module 226a, the first eye-gaze tracking module 230a, or a combination thereof.

In some examples, the CPU 202 can determine a hinge angle of the computing device 200. That is, the CPU 202 can determine the hinge angle of the hinge 240 between the first display 220a and the second display 220b. To that end, the CPU 202 can determine whether the GUI is included by the non-visible portion 460 of the portion 254 of the second display 220b based on the hinge angle. As the viewing distance p (the horizontal distance between the user 400 and an imaginary line vertically extending from the hinge 240) changes, the width s of the non-visible portion 450 changes as well per Equation 1.

In some examples, the CPU 202 can determine an orientation of the computing device 200 based on data received from the accelerometers 222 and/or the gyroscopes 224 (or other sensors on the computing device 200). That is, the CPU 202 can identify one of the displays 220 that the physical input device 250 is coupled to. That is, the CPU 202 can determine which one of the displays 220 is horizontal and which one of the displays 220 is vertical, or angled with respect to the other display 220. As a result of such orientation, the CPU 202 can determine which display 220 the physical input device 250 is physically coupled to, or possibly physically coupled to. In some examples, other sensors, such as a hall sensor, can detect the presence of the physical input device 250 on one of the displays 220 to determine the orientation (without knowledge of the hinge angle) of the computing device 200 (e.g., the display 220 that the hall sensor detects the physical input device 250 is coupled is horizontal).

Figure 5:
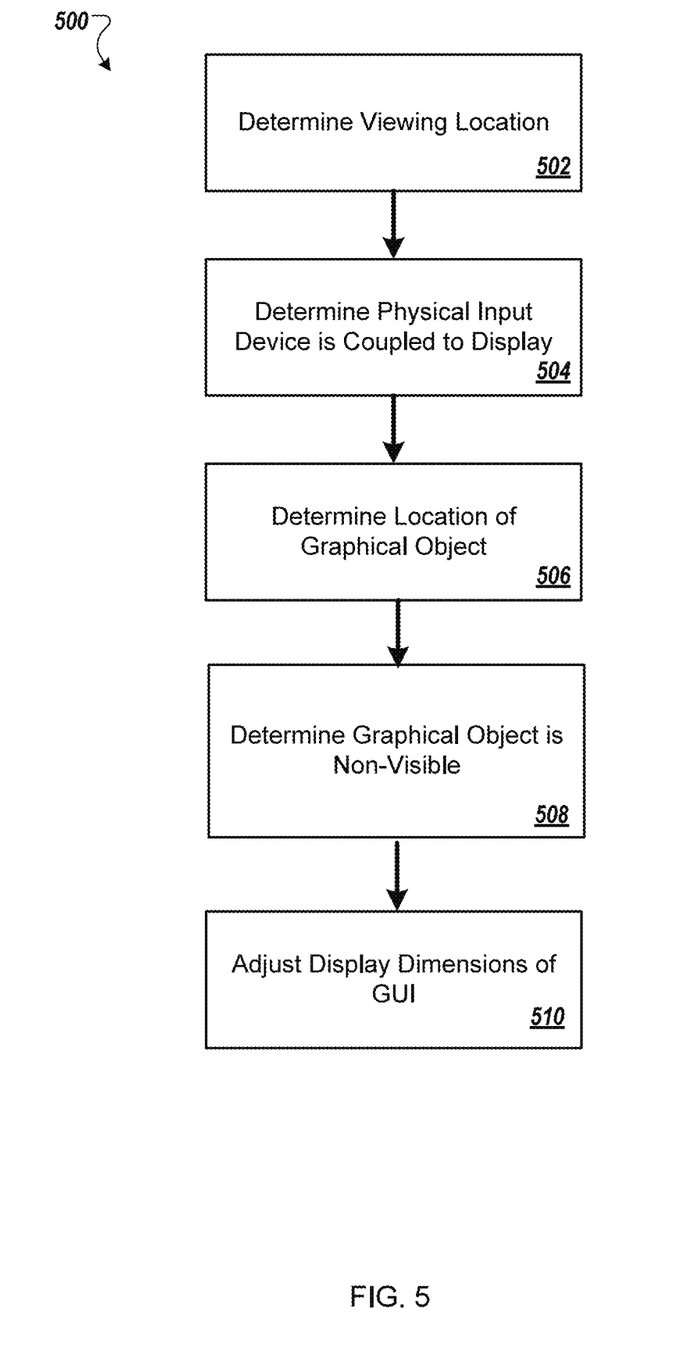
FIG. 5 illustrates a flowchart for adjusting a positioning of a user interface based on a user's position.

FIG. 5 illustrates a flowchart depicting selected elements of an embodiment of a method 500 for adjusting a positioning of a user interface based on a user's position. The method 500 may be performed by the information handling system 100, and/or the computing device 200 described herein with reference to FIGS. 1 and 2, or another information handling system. It is noted that certain operations described in method 500 may be optional or may be rearranged in different embodiments.

At 502, the CPU 202 determines a viewing location of a user 400 with respect to the computing device 200. In some examples, the viewing location includes a viewing distance and a viewing angle of the user 400 with respect to the computing device 200. At 504, the CPU 202 determines that the physical input device 450 is physically coupled to the second display 220b of the computing device 200. At 506, the CPU 202 determines a location of a graphical object within a graphical user interface (GUI) presented by the second display 220b of the computing device 200. In some examples, the CPU 202 determines the location of the graphical object in response to determining that the physical input device 250 is physically coupled to the second display 220b of the computing device 200. At 508, the CPU 202 determines that the graphical object is included by a non-visible portion of the GUI. In some examples, the CPU 202 determines that the graphical object is included by the non-visible portion of the GUI based on the viewing location of the user 400. At 510, the CPU 202 adjusts the display dimensions of the GUI such that an updated location of the graphical object is included by a visible portion of the GUI. In some examples, the CPU 202 adjusts the display dimensions of the GUI in response to determining that the graphical object is included by the non-visible portion of the GUI.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    determining, by a computing module, a viewing location of a user with respect to a computing device, the viewing location including a viewing distance and a viewing angle of the user with respect to the computing device;
    determining, by the computing module, that a physical input device is physically coupled to and positioned on a display of the computing device;
    in response to determining that the physical input device is physically coupled to and positioned on the display of the computing device, identifying, by the computing module, a non-visible portion of a graphical user interface (GUI) presented by the display of the computing device based on the viewing distance, the viewing angle, and the position of the physical input device on the display of the computing device;
    determining, by the computing module, that a graphical object is included by the non-visible portion of the GUI; and
    in response to determining that the graphical object is included by the non-visible portion of the GUI, adjusting, by the computing module, display dimensions of the GUI such that an updated location of the graphical object is included by a visible portion of the GUI.

2. The computer-implemented method of claim 1, further comprising:
    determining, by the computing module, a new viewing location of the user with respect to the computing device, the new viewing location including a new viewing distance and a new viewing angle of the user with respect to the computing device;
    identifying, by the computing module, an updated non-visible portion of the GUI based on the new viewing distance, the new viewing angle, and the positioning of the physical input device on the display of the computing device;
    determining, by the computing module, that the graphical object is included by the updated non-visible portion of the GUI; and
    in response to determining that the graphical object is included by the updated non-visible portion of the GUI, re-adjusting, by the computing module, display dimensions of the GUI such that a further updated location of the graphical object is included by the updated visible portion of the GUI.

3. The computer-implemented method of claim 2, wherein determining the viewing location of the user with respect to the computing device further comprises obtaining, by the computing module, camera-based data indicating the viewing location of the user, and wherein determining the new viewing location of the user with respect to the computing device further comprises obtaining, by the computing module, infrared time-of-flight data indicating the new viewing location of the user.

4. The computer-implemented method of claim 2, wherein determining the viewing location of the user with respect to the computing device further comprises obtaining, by the computing module, eye-gaze-based data indicating the viewing location of the user, and wherein determining the new viewing location of the user with respect to the computing device further comprises obtaining, by the computing module, infrared time-of-flight data indicating the new viewing location of the user.

5. The computer-implemented method of claim 2, wherein determining the viewing location of the user with respect to the computing device further comprises obtaining, by the computing module, camera-based data indicating the viewing location of the user, and wherein determining the new viewing location of the user with respect to the computing device further comprises obtaining, by the computing module, camera-based data indicating the new viewing location of the user.

6. The computer-implemented method of claim 1, wherein adjusting the display dimensions further comprises:
    determining, by the computing module, that an adjustment of the display dimensions is less than a threshold; and
    in response to determining that the adjustment of the display dimensions is less than the threshold, foregoing adjusting display dimensions of the GUI.

7. The computer-implemented method of claim 1, further comprising:
    determining, by the computing module, a hinge angle of the computing device,
    wherein the graphical object is determined to be included by the non-visible portion of the GUI further based on the hinge angle of the computing device.

8. The computer-implemented method of claim 1, wherein the computing device is a dual-display computing device, with each display of the dual-display computing device are within respective planes, the method further comprising:
    determining, by the computing module, an orientation of the computing device; and
    identifying, by the computing module and based on the orientation of the computing device, a particular display of the dual-display computing device that the physical input device is physically coupled to.

9. A computing device, comprising:
   a display device;
   a physical input device;
   a processor having access to memory media storing operations executable by the processor to:
      determine a viewing location of a user with respect to the computing device, the viewing location including a viewing distance and a viewing angle of the user with respect to the computing device;
      determine that the physical input device is physically coupled to and positioned on the display device;
      in response to determining that the physical input device is physically coupled to and positioned on the display device, identify a non-visible portion of a graphical user interface (GUI) presented by the display device based on the viewing distance, the viewing angle, and the position of the physical input device on the display of the computing device;
      determine that a graphical object is included by the non-visible portion of the GUI; and
      in response to determining that the graphical object is included by the non-visible portion of the GUI, adjust display dimensions of the GUI such that an updated location of the graphical object is included by a visible portion of the GUI.

10. The computing device of claim 9, wherein the physical input device is a keyboard.

11. The computing device of claim 9, the operations further comprising:
    determine a new viewing location of the user with respect to the computing device, the new viewing location including a new viewing distance and a new viewing angle of the user with respect to the computing device;
    identify an updated non-visible portion of the GUI based on the new viewing distance, new viewing angle, and the positioning of the physical input device on the display of the computing device;
    determine that the graphical object is included by the non-visible portion of the GUI; and
    in response to determining that the graphical object is included by the non-visible portion of the GUI, readjust display dimensions of the GUI such that a further updated location of the graphical object is included by the visible portion of the GUI.

12. The computing device of claim 11, further comprising:
    a camera module; and
    an infrared module,
    wherein the viewing location of the user is based on data provided by the camera module, and the new viewing location of the user is based on data provided by the infrared module.

13. The computing device of claim 11, further comprising:
    a camera module,
    wherein the viewing location of the user is based on data provided by the camera module, and the new viewing location of the user is based on data provided by the camera module.

14. The computing device of claim 9, wherein adjusting the display dimensions further comprises:
    determining that an adjustment of the display dimensions is less than a threshold; and
    in response to determining that the adjustment of the display dimensions is less than the threshold, foregoing adjusting display dimensions of the GUI.

15. The computing device of claim 9, the operations further comprising:
    determining a hinge angle of the computing device,
    wherein the graphical object is determined to be included by the non-visible portion of the GUI further based on the hinge angle of the computing device.

16. The computing device of claim 9, wherein the computing device further includes an additional display, wherein each display is within a respective plane, the operations further comprising:
    determining an orientation of the computing device; and
    identifying, based on the orientation of the computing device, a particular display that the physical input device is physically coupled to.

17. A non-transitory computer-readable medium storing software comprising instructions executable by one or more computers which, upon such execution, cause the one or more computers to perform operations comprising:
    determining a viewing location of a user with respect to a computing device, the viewing location including a viewing distance and a viewing angle of the user with respect to the computing device;
    determining that a physical input device is physically coupled to and positioned on a display of the computing device;
    in response to determining that the physical input device is physically coupled to and positioned on the display of the computing device, identify a non-visible portion of a graphical user interface (GUI) presented by the display of the computing device based on the viewing distance, the viewing angle, and the position of the physical input device on the display of the computing device;
    determining that a graphical object is included by the non-visible portion of the GUI; and
    in response to determining that the graphical object is included by the non-visible portion of the GUI, adjusting display dimensions of the visible portion of the GUI such that an updated location of the graphical object is included by the visible portion of the GUI.

18. The non-transitory computer-readable medium of claim 17, further comprising:
    determining a new viewing location of the user with respect to the computing device, the new viewing location including a new viewing distance and a new viewing angle of the user with respect to the computing device;
    identifying an updated non-visible portion of the GUI based on the new viewing distance, the new viewing angle, and the positioning of the physical input device on the display of the computing device;
    determining that the graphical object is included by the non-visible portion of the GUI; and
    in response to determining that the graphical object is included by the non-visible portion of the GUI, readjusting display dimensions of the visible portion of the GUI such that a further updated location of the graphical object is included by the visible portion of the GUI.

19. The non-transitory computer-readable medium of claim 17, wherein adjusting the display dimensions further comprises:
    determining that an adjustment of the display dimensions is less than a threshold; and in response to determining that the adjustment of the display dimensions is less than the threshold, foregoing adjusting display dimensions of the visible portion of the GUI.

20. The non-transitory computer-readable medium of claim 17, the operations further comprising:
determining a hinge angle of the computing device,
wherein the graphical object is determined to be included by the non-visible portion of the GUI further based on the hinge angle of the computing device.

* * * * *